United States Patent
Wu

(10) Patent No.: US 8,817,395 B2
(45) Date of Patent: Aug. 26, 2014

(54) PORTABLE HIGH-POWER MICROSCOPE MAGNIFICATION LENS STRUCTURE

(71) Applicant: Chen-Feng Wu, Taipei (TW)

(72) Inventor: Chen-Feng Wu, Taipei (TW)

(73) Assignee: Digilens Co., Ltd., Taipei (TW)

( * ) Notice: Subject to any disclaimer, the term of this patent is extended or adjusted under 35 U.S.C. 154(b) by 133 days.

(21) Appl. No.: 13/684,335

(22) Filed: Nov. 23, 2012

(65) Prior Publication Data
US 2014/0146396 A1 May 29, 2014

(51) Int. Cl.
*G02B 27/02* (2006.01)
*G02B 21/02* (2006.01)
*G02B 21/06* (2006.01)

(52) U.S. Cl.
CPC .................................. *G02B 21/06* (2013.01)
USPC ........................... 359/802; 359/656; 359/803

(58) Field of Classification Search
USPC .......................................... 359/656, 802, 803
See application file for complete search history.

(56) References Cited

U.S. PATENT DOCUMENTS 6,785,062 B1 * 8/2004 Daley et al. .................... 359/802

* cited by examiner

*Primary Examiner* — William Choi

(57) ABSTRACT

A portable high-power microscope magnification lens structure, mainly comprises: a main body, a high-power lens being disposed on a middle part thereof which is passed through, an adhesive portion being disposed on a rear edge of the main body, LED lamps used for light compensating illumination being disposed around the lens on a front side of the main body; and a rear cover, one side thereof being pivotally connected to the main body, the rear cover being foldable to cover a rear side of the main body, and a hollow space for receiving batteries being disposed on the rear cover and connected to the LED lamps through a switch; whereby, the additional unit can be attached to the lens of a cellular phone, tablet or camera, used to shoot and observe high-power microscopically magnified images, used as the teaching assistance for the observation of organisms or physical objects, and used for the microscopic magnification photography of the details of other industrial product structures, and the pictures taken from the above can be transmitted to an Internet system immediately.

11 Claims, 9 Drawing Sheets

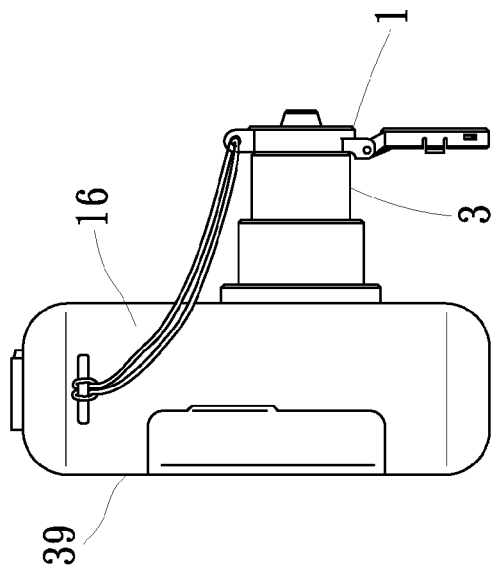
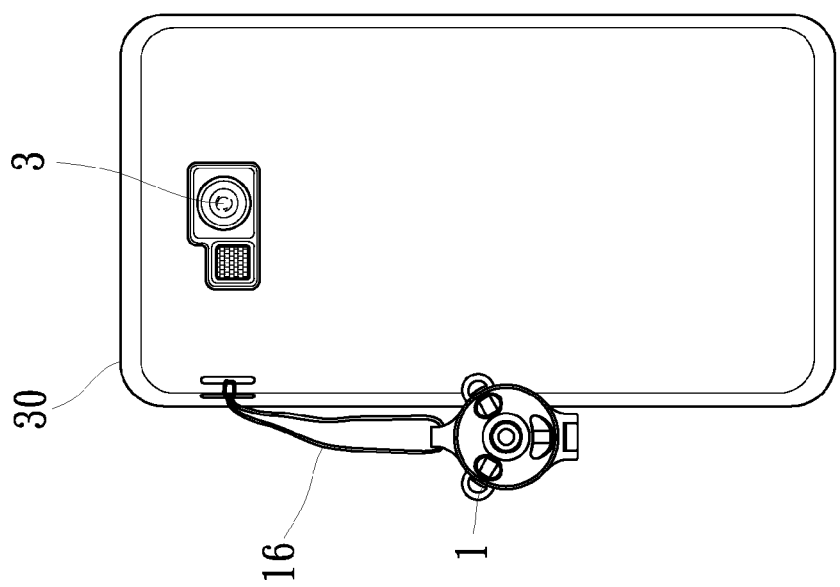
Fig. 6
Fig. 5

PORTABLE HIGH-POWER MICROSCOPE MAGNIFICATION LENS STRUCTURE

BACKGROUND OF THE INVENTION

1. Field of the Invention

The present invention relates to a portable high-power microscope magnification lens structure, and more particularly to a lens structure capable of being attached onto the lens of cellular phones, tablet computers or cameras so as to observe and capture high magnification images.

2. Background

The relationship between technologies and modern life is inseparable nowadays. Almost every person has at least one digital camera device, which may be an instamatic or single lens reflex, or may even be provided on a cellular phone or tablet. Obviously, everyone can be an amateur photographer. These digital photographic devices, cellular phones, tablets and digital cameras also have communication functions and are portable. In addition, digital information and image processing technologies are improving each passing day, such that the functions of cellular phones and tablets have also grown and developed rapidly. New generations of smart phones and tablets have improved operational capabilities to provide important communication tools in modern life.

However, usually only a simple fixed-focus lens can be installed on these advanced digital photographic devices, cellular phones or tablets due to limitations imposed by shape, volume and weight; it then collocates images with an inbuilt image processing technology for different shooting ranges. Alternatively, a physical electric telescopic optical focusing system is installed on a camera to carry out wide-angled telescopic shooting or near-field shooting. But, in fact, this method is still at a level of general near-field shooting magnification, and is insufficient for microscopic shooting.

To improve on the defects mentioned above, Taiwan Patent No. M244478 discloses a lens plug-in module that can be combined with cellular phones or tablets; Taiwan Patent No. M367354 discloses an additional lens seat capable of being clamped on different diameters of lenses of photographic devices; China Patent No. CN03157702 discloses an attachable lens for a camera; China Patent No. CN200820043728 discloses an external lens module for a cellular phone or tablet, etc. However, these additional lens structures are unable to be compatible with every brand and every type of cellular phone or tablet. Moreover, some of them are not even designed properly, causing electronic malfunctioning and optical axis correspondence failure. In addition, the functions thereof are suitable for near-field telescopic shooting, wide-angle shooting, and a general low-power near-field shooting magnification in normal photography, and incapable of being used as a microscope for capturing clearly the minute surface of an object that can be observed clearly through microscopic magnification. In addition, these additional lens structures are also deficient in photographic light compensation and lens protection.

SUMMARY OF THE INVENTION

To improve the defects of the conventional structures mentioned above, the present invention is proposed.

The present invention proposes a portable high-power microscope magnification lens structure, which includes:
a main body, a high-power lens being disposed on a middle portion thereof which is passed through, an adhesive portion being disposed on a rear edge of the main body, LED light sources used for light compensation being disposed around the lens on a front side of the main body; and
a rear cover, one side of thereof being pivotally connected to the main body, the rear cover being liftably covered on a rear side of the main body, and a hollow space for receiving batteries being disposed on the rear cover and connected to the LED light sources through a switch;
whereby, the additional unit can be attached to the lens of a cellular phone, tablet or camera, used to shoot and observe high-power microscopically magnified images, used as a teaching assistant for the observation of organisms or physical objects, and used for the microscopic magnification photography of the details of other industrial product structures; furthermore, the pictures taken from the above can be transmitted to the Internet through a WiFi function of a cellular phone, tablet or camera, obtaining a "shoot-and-transmit" effect.

BRIEF DESCRIPTION OF THE DRAWINGS

The present invention can be more fully understood by reference to the following description and accompanying drawings, in which:

FIG. 5 is a schematic view of the present invention hung on an old-style cellular phone;

FIG. 6 is a schematic view of the present invention connected and hung on a camera;

DETAILED DESCRIPTION OF THE PREFERRED EMBODIMENTS

Figure 1:
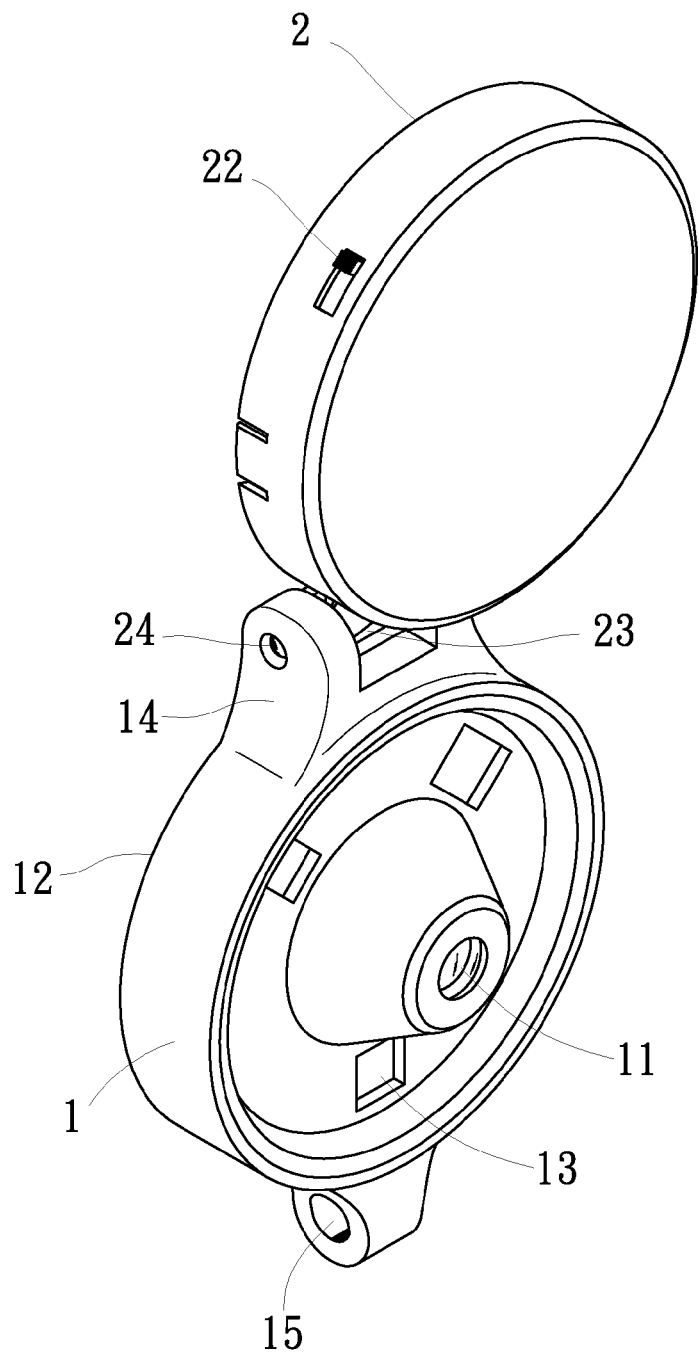
FIG. 1 is a perspective view of the present invention while being expanded.
Figure 2:
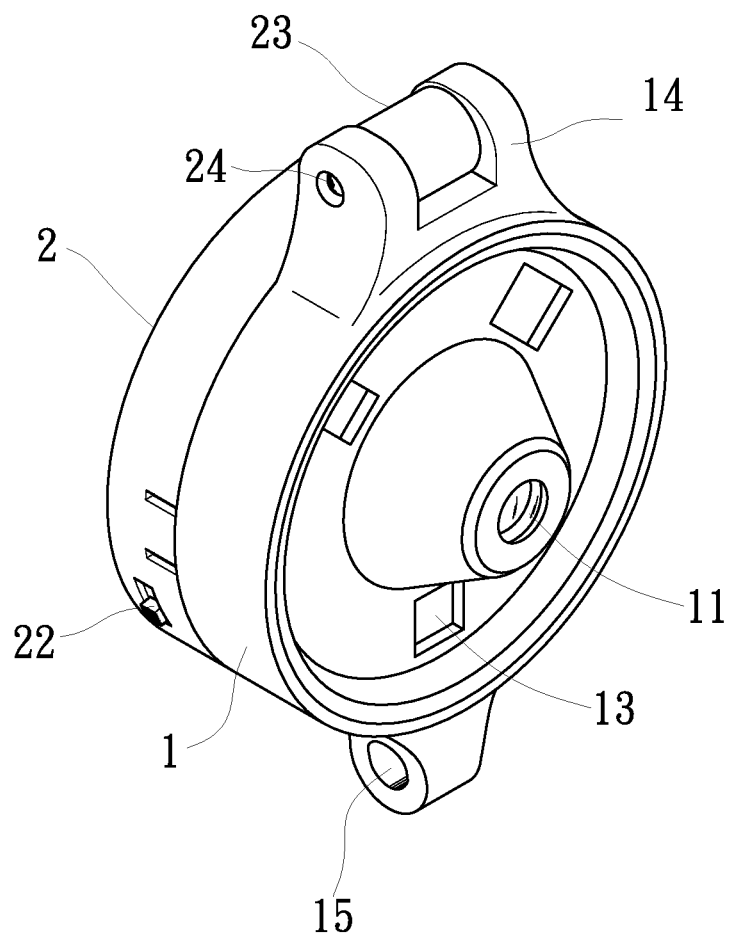
FIG. 2 is a perspective view of the present invention while being folded together.
Figure 3:
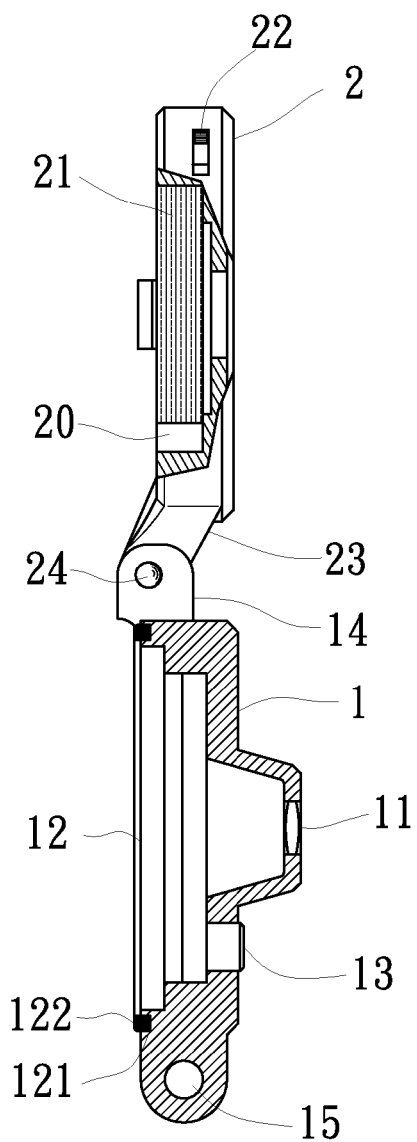
FIG. 3 is a partial cross-sectional plane view of the present invention.

Referring to FIGS. 1 to 3, a portable high-power microscope magnification lens structure according to the present invention comprises a main body 1 and a rear cover 2.

A high-power lens 11 is disposed on the passed-through middle part of the main body 1. An adhesive portion 12 is disposed on the rear edge of the main body 1, and LED lamps 13 for light compensating illumination are disposed around the lens 11, on the front side of the main body 1.

Furthermore, one side of the rear cover 2 is pivotally coupled to the main body 1; it can be lifted from and covered onto the rear side of the main body 1. A hollow space 20 for receiving batteries 21 is disposed on the rear cover 2 and electrically connected to the LED lamps 13 through a switch 22.

While being put into practice, a first protruding portion 14 with a first pivoting hole is projected from one end of the main body 1. A second protruding portion 23 with a second pivoting hole is projected from one end of the rear cover 2, and a pivoting axle is used to couple them together. An annular groove 121 is disposed on the main body 1, and a projecting annular jelly glue 122 is mounted on the groove 121 to form the above-mentioned adhesive portion 12. The magnification power of the high power lens is in the range of 5 to 400, and the one to eight LED lamps 13 may be configured around the lens 11 separately to achieve an omnibearing uniform illumination effect.

Figure 4A:
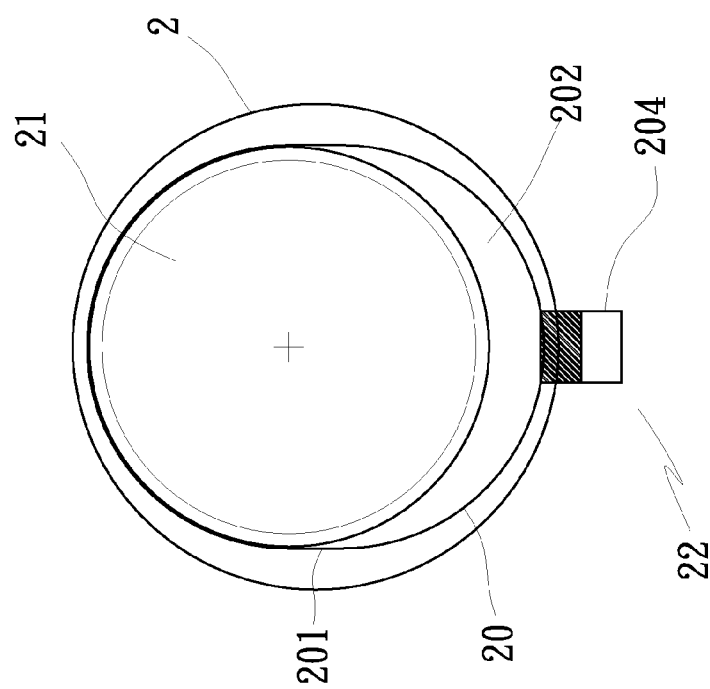
FIG. 4A is a schematic view of the present invention with a rear cover configured with a simple switch.
Figure 4B:
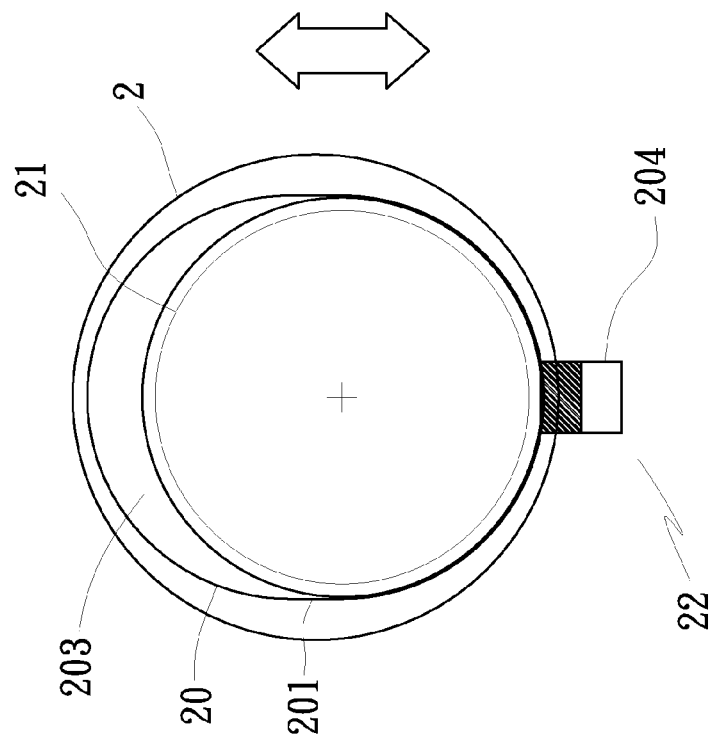
FIG. 4B is a schematic view of the present invention with a simple switch of a rear cover in an electric communication state after being switched.

In addition, referring to FIGS. 4A and 4B, to reduce costs and save a portion of the configuration space effectively, the switch 22 on the rear cover 2 may be further simplified; namely, that the hollow space 20 of the rear cover 2 is redesigned as an elliptical body, and the hollow space 20 is divided into two open regions 202 and 203 by a slightly bulged waistline 201; batteries 21 are mounted in the open region 202, and an elastic metal sheet 204 is disposed on the rear side of the other open region 202. Therefore, only pushing the batteries 21 to move between the two open regions 202 and 203, the batteries 21 can then be in touch with or separated from the elastic metal sheet 204. Such kind of construction is simple, saves materials, and saves space, and a good switching effect can be achieved without needing to add excessive parts.

Furthermore, the present invention may be customized while being put into practice, and more cost-saving products without LED light compensating illumination may be made (not shown in the figures), thereby allowing customers to have more choices upon purchase.

Figure 7:
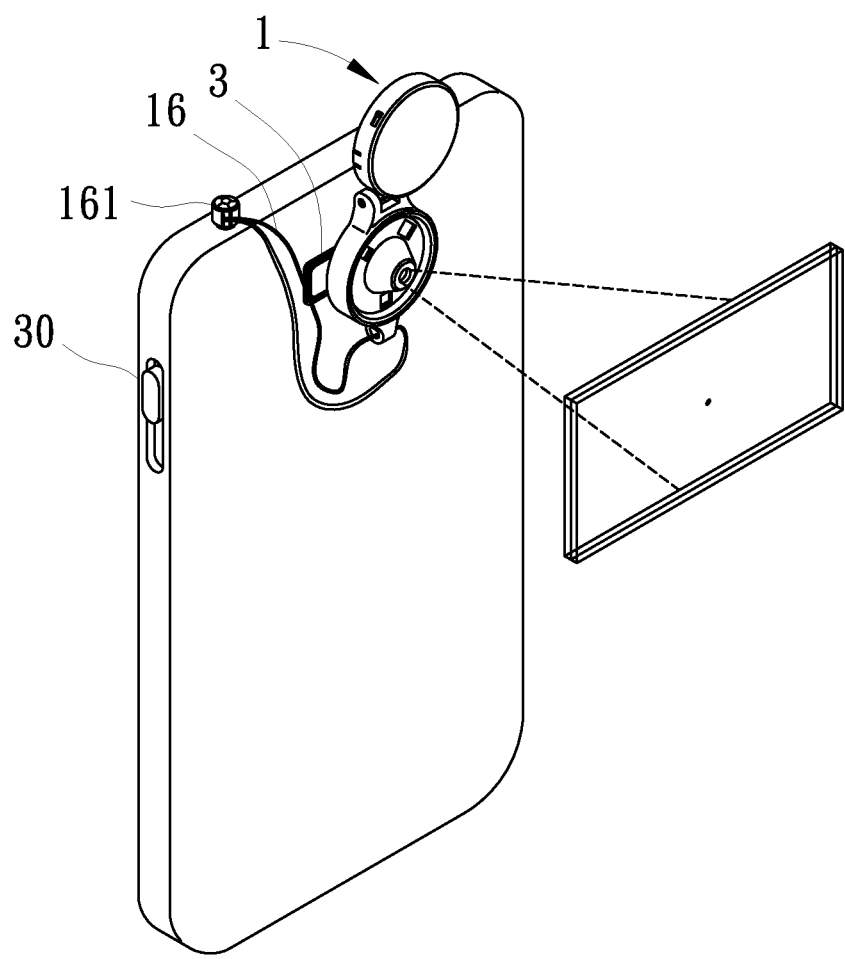
FIG. 7 is a schematic view of the present invention inserted in and adhered to a new-style cellular phone.
Figure 8:
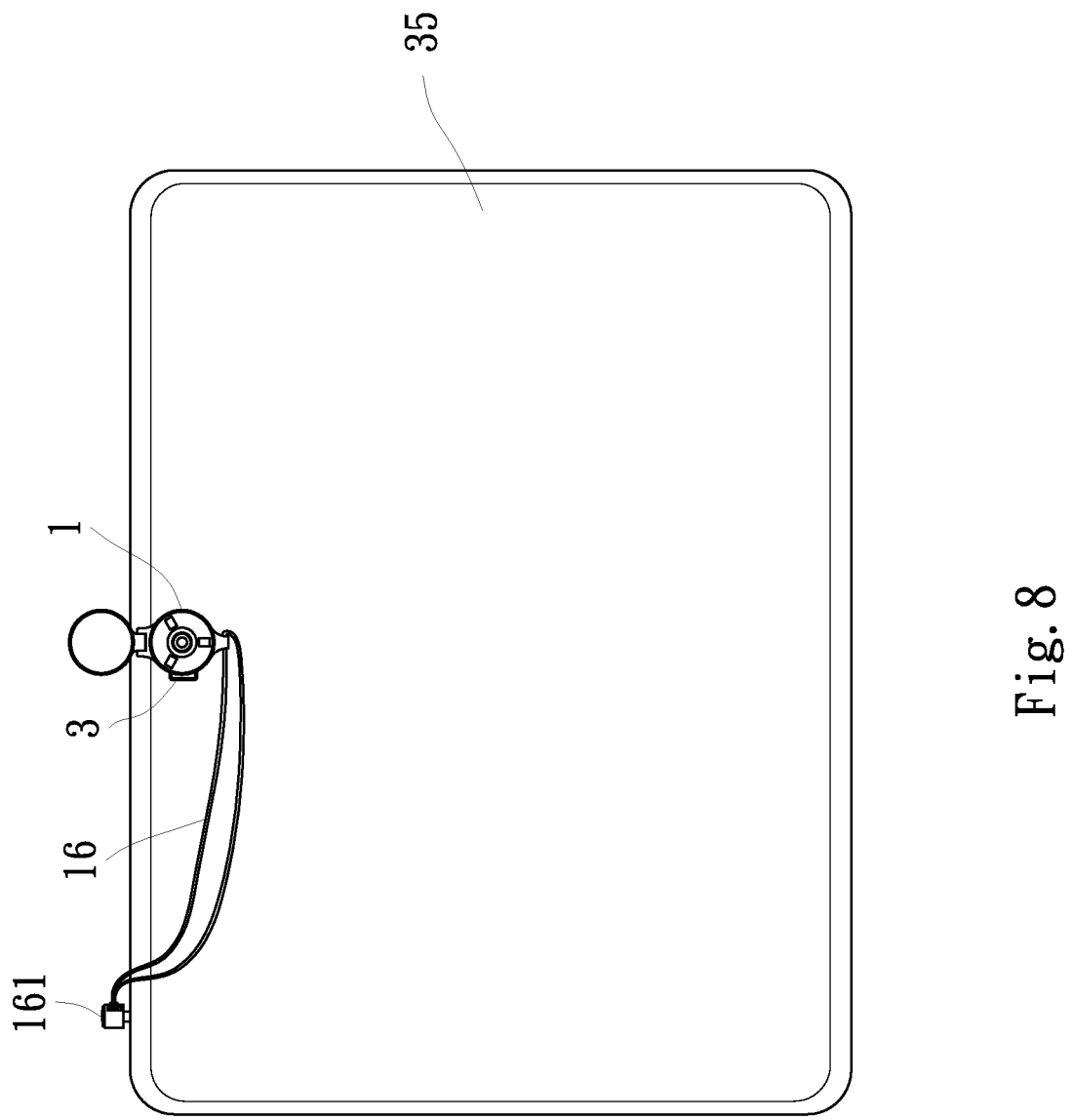
FIG. 8 is a schematic view of the present invention inserted in and adhered to a tablet.

In one model of the main body 1 of the present invention, referring to FIGS. 5 to 8, the main body 1 and the rear cover 2 may even be matched to provide a cartoon head sculpture, thereby making the outlook of the product more eye-appealing and therefore using it as a phone strap. Furthermore, a hanging hole 15 is disposed projectively on one side of the main body, allowing a string 16 to be passed through it and tied on an old-style cellular phone 30 or camera 39, as FIGS. 5 and 6 show. An earphone plug 161 is further configured on the rear end of the string 10, thereby inserting it directly into a new-style cellular phone 30 or tablet 35, as FIGS. 7 and 8 show, allowing customers to choose the additional lens 11 of a type desired to match their devices (cellular phone, tablet or camera). The structure of the present invention has a proper size such that it can be commonly used on general cellular phones 30, tablets 35 or digital cameras 39. Therefore, picture capturing and photography can be more enjoyable and the actions thereof are not influenced even without high costs.

Figure 9:
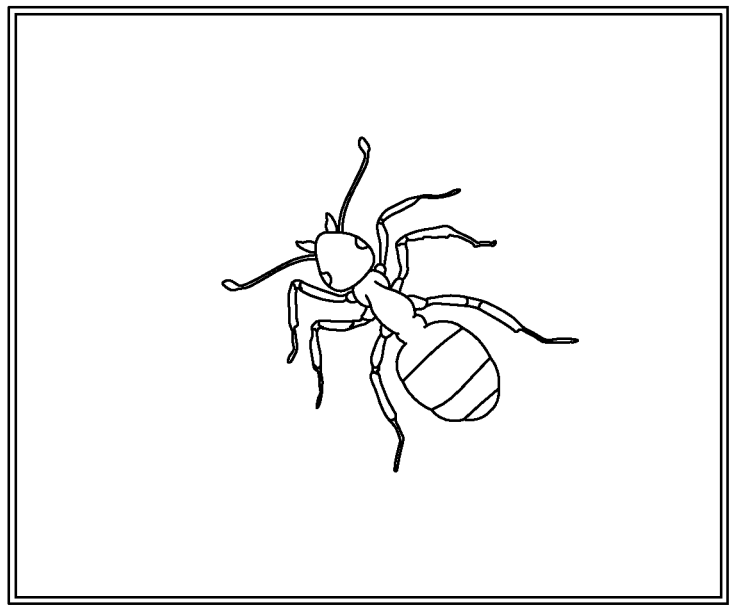
FIG. 9 is a schematic of a microscopically magnified microorganism image captured and observed by the cellular phone in FIG. 7.

The detailed practice of the present invention may be seen in FIGS. 2 and 5. The rear cover 2 and the main body 1 are folded together while the present invention is not in use, thereby protecting the adhesive portion 12 from being stained with dust and thus lose stickiness, allowing the rear cover 2 and main body 1 to be combined accurately into a one-body model. The application of the present invention may be seen in FIGS. 7 to 9. The rear cover 2 is lifted up, the adhesive portion 12 of the main body 1 is then adhered onto the lens 3 of the camera 30, as FIG. 6 shows, on the lens 3 of the cellular phone 30, as FIG. 7 shows, or on the lens 3 of the tablet 35, as FIG. 8 shows, allowing the optical axis of the high-power lens 11 to correspond to the optical axis of the lens 3. At this time, only starting a normal camera or photography function, and matching it with a scaling function, a different magnification effect can be achieved. In the night time or as required, the switch 22 may be switched on to allow the batteries 21 to be electrified to light the LED lamps 13 to strengthen light compensation for the environment, reducing after image caused from an insufficient light source during image capturing. In addition, the high-power lens 11 of the present invention is used to observe high-power microscopic magnification images, as FIG. 9 shows, allowing for the teaching assistance of organisms or physical object observation, or the use of the microscopic magnification picture taking of the details of industrial products. Furthermore, the pictures can be transmitted to the Internet immediately by means of the WiFi functionality of the cellular phone 30, tablet 35 or camera 39, achieving a real-time effect.

Figure 11:
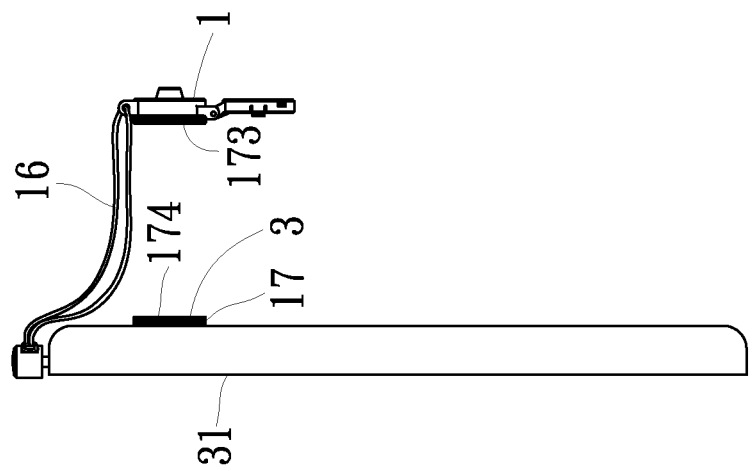
FIG. 11 is a schematic view of a main body and housing of the present invention on which male and female threaded engagement portions are mutually disposed.
Figure 10:
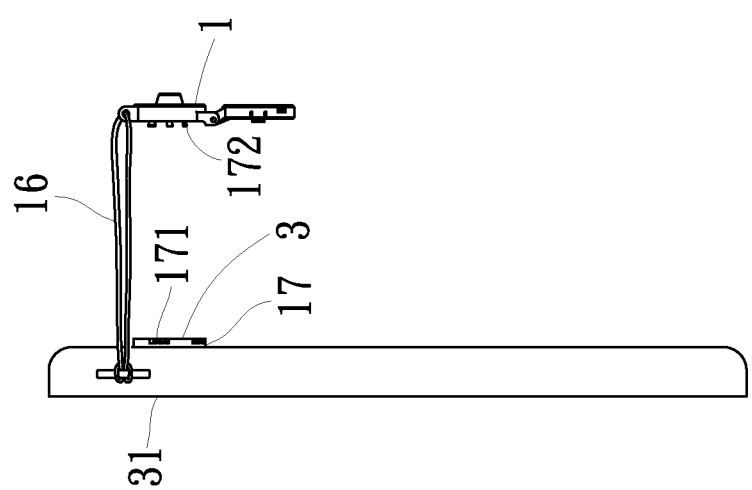
FIG. 10 is a schematic view of a main body and housing of the present invention on which a recess groove and locking block are mutually disposed.

Alternatively, referring to FIGS. 10 and 11, in exemplary embodiments of the present invention, the adhesive portion 12 on the rear side of the main body 1 may also be replaced with a coupling portion 17 mutually disposed with the one on the housing 31 on which the lens 3 is disposed. For example, a recess groove 171 and locking block 172 or male and female threads 173 and 174 are used to replace the adhesive portion 12; they also similarly allow the combination of the lens 11 of the present invention with the lens 3 on a cellular phone, tablet or camera, and therefore the shooting and observation of high-power microscopically magnified images can be carried out.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable high-power microscope magnification lens structure, capable of being adhered to and combined with a lens of a cellular phone, tablet, or camera for the photographing of microscopically magnified images, comprising:
   a main body having a high-power lens disposed through a middle portion, an adhesive portion disposed on a rear edge of the main body, LED lamps used for lighting disposed around the lens on a front side of the main body; and
   a rear cover pivotally connected to the main body at one side and capable of covering a rear side of the main body, having a hollow space for accepting at least one battery, and electrically connected to the more than one LED lamps through a switch.

2. The lens structure according to claim 1, wherein a first protruding portion with a first pivoting hole is projected from one end of the main body, a second protruding portion with a second pivoting hole is projected from one end of the rear cover, and a pin is used to couple the first pivoting hole and the second pivoting hole together.

3. The lens structure according to claim 2, wherein the magnification power of the high power lens is in a range from 5 to 200.

4. The lens structure according to claim 3, wherein the number of LED lamps disposed around the lens is from 2 to 8.

5. The lens structure according to claim 4, wherein an annular groove is disposed on the main body, and a projecting rubber glue is mounted thereon to form the adhesive portion.

6. The lens structure according to claim 5, wherein a third protruding portion with a hole, accepting a string to be passed through to use as a phone strap, is projected from the main body.

7. The lens structure according to claim 6, wherein an earphone jack is further provided on a rear end of the string.

8. The lens structure according to claim 6, wherein the main body and rear cover are designed to form a sculpture together.

9. A portable high-power microscope magnification lens structure, capable of being adhered to and combined with a lens of a cellular phone, tablet, or camera for the photographing of high-power microscopically magnified images, comprising:
- a main body having a high-power lens with a housing disposed through a middle portion, more than one coupling portions disposed correspondingly on a rear edge of the main body and the housing, more than one LED lamp used for lighting disposed around the lens on a front side of the main body; and
- a rear cover pivotally connected to the main body at one side and capable of covering a rear side of the main body, having a hollow space for accepting at least one battery, and electrically connected to the more than one LED lamps through a switch.

10. The lens structure according to claim 9, wherein the coupling portions are an engaging groove and an engaging protrusion.

11. The lens structure according to claim 9, wherein the coupling portions are corresponding threads.

* * * * *